United States Patent [19]

Mikami et al.

[11] Patent Number: 4,852,423
[45] Date of Patent: Aug. 1, 1989

[54] CAP ATTACHING STRUCTURE OF HANDLE GRIP

[75] Inventors: Tetsuo Mikami, Fujimi; Yasushi Ohmika; Hidetoshi Miyazaki, both of Shiki, all of Japan

[73] Assignee: Honda Giken Kogyo Kabushiki Kaisha, Tokyo, Japan

[21] Appl. No.: 124,981

[22] Filed: Nov. 24, 1987

[30] Foreign Application Priority Data

Nov. 25, 1986 [JP] Japan .................. 61-280305

[51] Int. Cl.$^4$ .................................... B62K 21/26
[52] U.S. Cl. ................................ 74/551.9; 74/558
[58] Field of Search .............. 74/551.9, 551.1, 558, 74/558.5; 411/372, 371, 431, 508; 16/111 R; 273/73 J, 81 R, 81 C, 81 B, 81 D, 81.3, 67 DB, 67 DA, 68

[56] References Cited

U.S. PATENT DOCUMENTS

| | | | |
|---|---|---|---|
| 702,763 | 6/1902 | Aurness | 74/551.9 |
| 1,298,306 | 3/1919 | Dodds | 411/372 |
| 2,095,289 | 10/1937 | Rosenberg | 411/431 |
| 2,666,340 | 1/1954 | Hunt | 74/558 |
| 3,250,729 | 9/1965 | Golden | 74/551.9 |
| 3,606,325 | 9/1971 | Lamkin | 74/551.9 |
| 3,779,551 | 12/1973 | Wilson | 273/81 R |
| 3,991,446 | 11/1976 | Mooney | 411/508 |
| 4,195,837 | 4/1980 | Poulin | 273/81 D |
| 4,261,567 | 4/1981 | Uffindell | 273/81 R |
| 4,535,649 | 8/1985 | Stahel | 74/551.1 |

FOREIGN PATENT DOCUMENTS

| | | | |
|---|---|---|---|
| 547888 | 11/1959 | Belgium | 74/551.9 |
| 822503 | 11/1951 | Fed. Rep. of Germany | 74/551.9 |
| 3521621 | 1/1986 | Fed. Rep. of Germany | 273/73 J |
| 16103 | of 1898 | United Kingdom | 74/551.9 |

Primary Examiner—Gary L. Smith
Assistant Examiner—Flemming Saether
Attorney, Agent, or Firm—Birch, Stewart, Kolasch & Birch

[57] ABSTRACT

A handle grip for resiliently attaching to a handle tube having a predetermined outer diameter includes a grip body formed of a resilient material and having a first end and a second end. An inner bore which has a diameter slightly smaller than the predetermined outer diameter of the handle tube extends from the first end of the grip body toward the second end of the grip body. An attaching portion is formed in an outer surface of the grip body adjacent to the second end of the grip body. The attaching portion includes at least one engaging groove formed therein. A cap member includes at least one engaging projection. The cap member is positioned on the attaching portion with the engaging projection being received within the engaging groove. Mounting the cap member on the attaching portion and mounting the grip body on the handle tube creates a resilient expansion force due to the smaller diameter of the inner bore of the grip body relative to the predetermined outer diameter of the handle tube for securely retaining the cap member to the grip body.

8 Claims, 4 Drawing Sheets

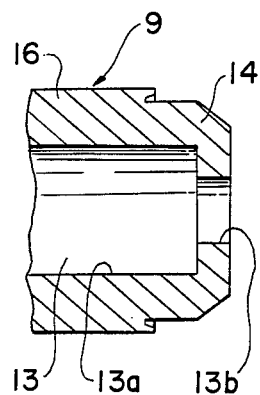
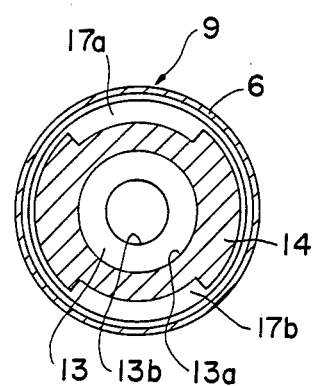
FIG. 4    FIG. 5
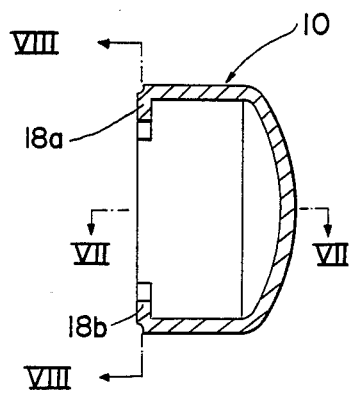
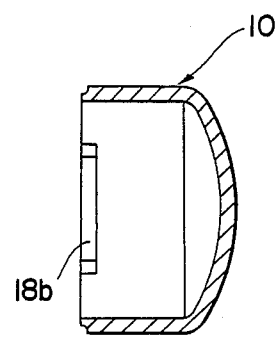
FIG. 6    FIG. 7
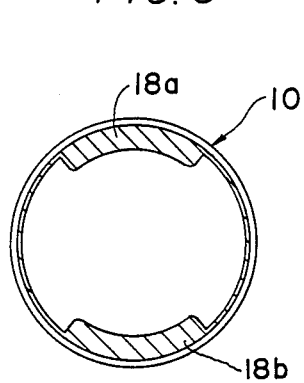
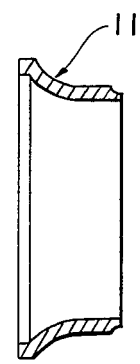
FIG. 8    FIG. 9

CAP ATTACHING STRUCTURE OF HANDLE GRIP

BACKGROUND OF THE INVENTION

1. Field of the Invention

The present invention relates to a cap attaching structure of a handle grip for a motorcycle or the like.

2. Description of Background Art

In the prior art, a cap for a handle grip has been attached by screwing the cap onto a threaded leading end of the handle tube or by adhering the cap to the handle grip. However, attaching the members by screwing requires screw threads on the cap and the handle tube. This procedure leaves room for improvement in the assembling process. Also, attaching the members by adhering the members together requires time for drying the adhesive. There is a possibility that the cap may fall off due to bad adhesion to the handle grip. Similarly, this procedure leaves room for improvement in its assembling process.

OBJECTS AND SUMMARY OF THE INVENTION

In order to solve the problems in the prior art mentioned above, it is an object of the present invention to provide a cap attaching structure of a handle grip which is capable of improving the assembling process and reducing the cost of assembling the members.

In order to attain the above object, the present invention provides a cap attaching structure of a handle grip having a handle tube, steering stem, a grip body and a cap. The grip body is made from a resilient member and is provided with an inner bore which is somewhat smaller than an outer diameter of the handle tube. The grip body is provided with an attaching portion at a leading end opposite to the steering stem. The cap on the grip body is resiliently attaching to the engaging portion. A leading end of the handle tube is inserted into the inner bore up to a position at the leading end of the grip body.

Since the cap is resiliently engaged to the attaching portion of the grip body and the handle tube is inserted into the inner bore of the grip body, the cap is rigidly attached to the leading end of the grip body due to the cap being resiliently engaged to the expanded attaching portion of the grip body when inserted on the handle tube.

Further scope of applicability of the present invention will become apparent from the detailed description given hereinafter. However, it should be understood that the detailed description and specific examples, while indicating preferred embodiments of the inventing, are given by way of illustrating only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a longitudinal cross-sectional view taken along line IV—IV in FIG. 3;

FIG. 5 is a transverse cross-sectional view taken along line V—V in FIG. 3;

FIG. 6 is a longitudinal cross-sectional view showing a cap;

FIG. 7 is a longitudinal cross-sectional view taken along line VII—VII in FIG. 6;

FIG. 8 is a transverse cross-sectional view along line VIII—VIII in FIG. 6;

FIG. 9 is a longitudinal cross-sectional view showing a ring;

DETAILED DESCRIPTION OF THE PREFERRED EMBODIMENTS

Figure 1:
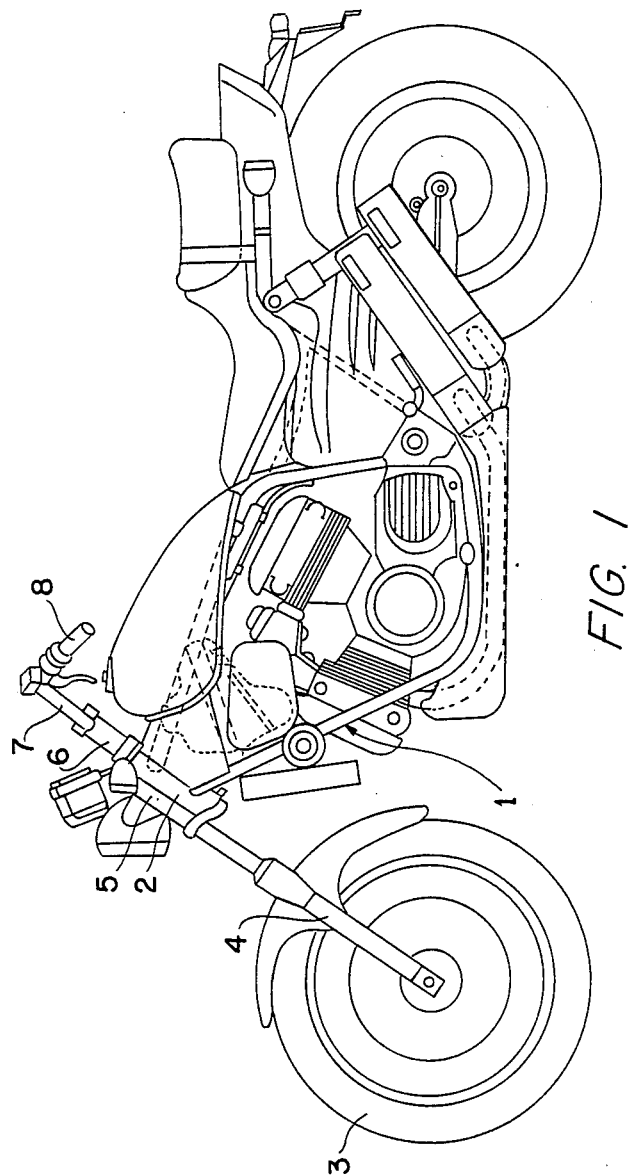
FIG. 1 is a side view showing a motorcycle applying a cap attaching structure of a handle grip according to the present invention.

FIG. 1 is a side view showing a motorcycle having a cap attaching structure of a handle grip according to the present invention. In FIG. 1, a vehicle body frame 1 includes a head tube 2 at a front end thereof. The head tube 2 rotatably supports a front fork 4 to which a front wheel 3 is connected on a shaft. A steering stem 6 is mounted on the head tube 2 through the intermediary of a top bridge 5. A handle 7 is mounted on the steering stem 6 and includes a handle grip 8 or the like.

Figure 2:
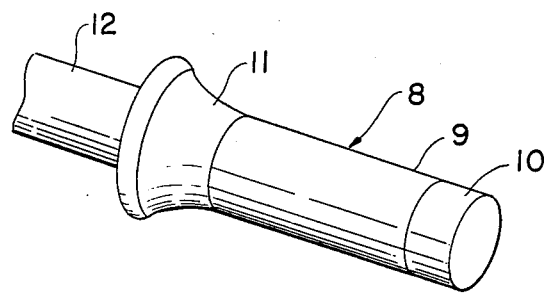
FIG. 2 is a perspective view showing a handle grip and a handle tube.

As shown in FIG. 2, the handle grip 8 is constituted by a grip body 9, a cap 10 and a ring 11. A handle tube 12 is inserted into the grip body 9 as described hereinafter.

Figure 3:
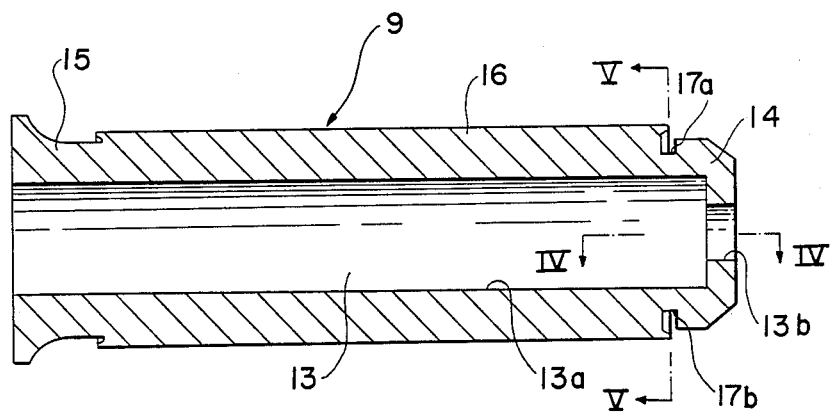
FIG. 3 is a longitudinal cross-sectional view showing a grip body.

The grip body 9 is made from a resilient member which is supple and which is easy to deform, for example, a rubber like member of polyvinyl chloride or the like. The grip body 9 has an inner bore 13, as shown in FIGS. 3 to 5, and is substantially cylindrical. A cap attaching portion 14 is integrally formed at one end, as illustrated at the right end portion of FIG. 3. The attaching portion 14 is at an end of the grip body 9 distal to the steering stem 6. A ring attaching portion 15 is integrally formed at the other end, as illustrated at the left end portion of FIG. 3. A small aperture 13b which is smaller than the diameter 13a of the inner bore 13 is formed in a transverse end wall of the grip body 9. A position of a leading end of the handle tube 12 is adapted to be limited by the transverse end wall. Also, an outer diameter of the cap attaching portion 14 is smaller than an outer diameter of a center portion 16.

Two engaging grooves 17a, 17b are formed on an outer peripheral surface of the cap attaching portion 14 at diametrically opposing positions. Engaging projections 18a, 18b of the cap 10 are mounted in the engaging grooves 17a, 17b as described hereinafter.

The cap 10 is made from a rigid member, for example, a rigid resin plated with chromium. As illustrated in FIGS. 6 to 8, two engaging projections 18a, 18b at positions corresponding to the engaging grooves 17a, 17b are formed at an open end of the cap 10. The cap 10 is adapted to resiliently engage with the cap attaching portion 14 as the cap 10 is mounted on the attaching portion 14 by a dimension relationship between the cap 10 and the cap attaching portion 14.

The ring attaching portion 15 is formed in a trumpet shape. A ring 11 is resiliently fitted on the ring attaching portion 15. As illustrated in FIG. 9, the ring 11 includes an inner shape which fits about an outer shape of the ring attaching portion 15. Also, the ring 11 is formed of a rigid material in a similar manner as the cap 10.

The following description is made with respect to a function of the present invention having the constitution mentioned above.

In order to assemble the handle grip 8 which includes the grip body 9, the cap 10 and the ring 11 on the handle tube 12, the following steps are performed.

Figure 10:
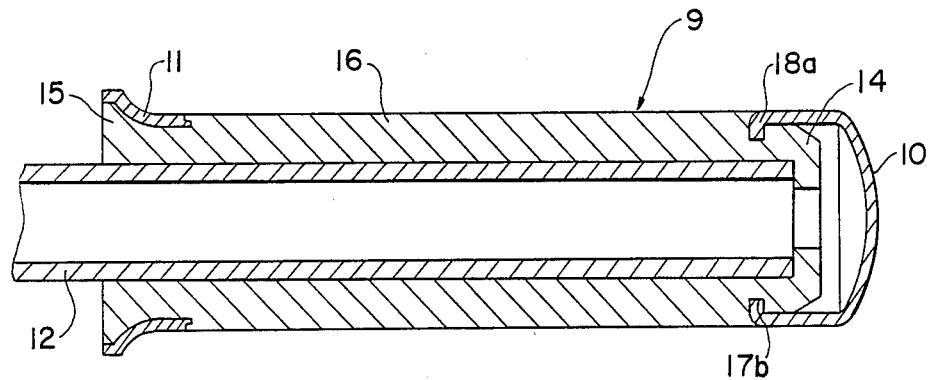
FIG. 10 is a longitudinal cross-sectional view showing the assembled handle grip and the handle tube.
Figure 11:
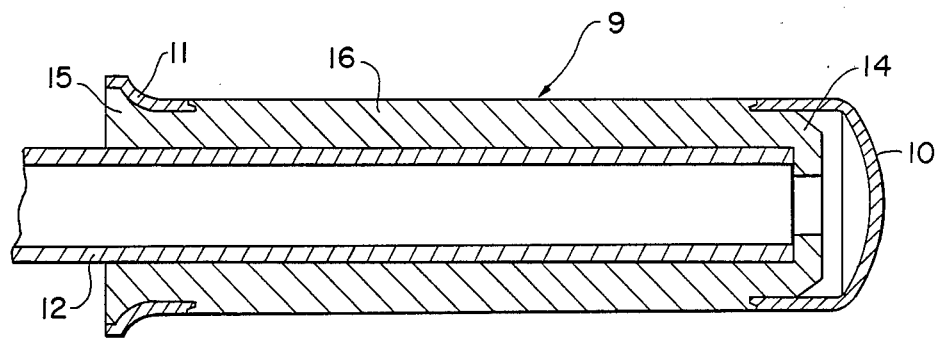
FIG. 11 is a longitudinal cross-sectional view taken along line XI—XI in FIG. 10.

Firstly, the cap 10 is positioned on the cap attaching portion 14 and the engaging projections 18a, 18b are engaged with the engaging grooves 17a, 17b. The cap 10 is adapted to resiliently engage the end of the grip body 9, as illustrated in FIGS. 10 and 11. Secondly, the ring 11 is adapted to resiliently engage the ring attaching portion 15 of the grip body 9. In such a condition, the handle tube 12 is inserted into the inner bore 13 of the grip body 9.

Since the diameter of the inner bore 13 of the grip body 9 is formed to be somewhat smaller when unstressed than the outer diameter of the handle tube 12, a resilient force acts on the grip body 9 to expand its outer surface radially when assembled as described above. Since the resilient force acts on the inner peripheral surface of the cap 10 and the ring 11 both of which have been resiliently previously engaged through the intermediary of the outer peripheral surface of the grip body 9, the resilient forces can easily and securely prevent the cap 10 and the ring 11 from disengaging from the grip body 9.

As mentioned above in detail, the present invention provides an attaching structure wherein the cap 10 is resiliently engaged on the grip body 9 which is inserted onto the handle tube 12. The handle tube 12 is provided with an outer diameter somewhat larger than the inner bore 13a of the grip body 9. Accordingly, a resilient expansion force acts on the inner perpheral surface of the cap 10 through the intermediary of the outer peripheral surface of the grip body 9, when the gri body 9 is inserted on the handle tube 12. Therefore, the resilient force and frictional force makes it possible to realize a simple and rigid attaching structure which consists of the grip body 9, the cap 10 and the handle tube 12. Accordingly, the present invention is capable of improving the assembling process and tends to reduce the cost of manufacturing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A handle grip for resiliently attaching to a handle tube having a predetermined outer diameter, said handle grip comprising:
   a grip body having a predetermined thickness formed of a resilient material and having a first end, a second end and an outer surface extending between said first and second ends;
   an inner bore having a diameter slightly smaller than the predetermined outer diameter of the handle tube, said inner bore extending axially within said grip body between the first and second ends thereof;
   an attaching portion formed in said outer surface of said grip body adjacent to said second end of said grip body, said attaching portion including two engaging grooves formed therein, said engaging grooves extending radially inwardly partially through the thickness of said grip body from said outer surface toward the axis of said inner bore at positions locatd about said inner bore and circumferentially spaced from each other about said axis; and
   a cap member including two radially inwardly extending engaging projections, said cap member positioned on said attaching portion with said engaging projections being received within said engaging grooves;
   whereby mounting said cap member on said attaching portion and mounting said grip body on said handle tube creates a resilient expansion force at said outer surface due to the smaller diameter of said inner bore of said grip body relative to the predetermined outer diameter of said handle tube for securely retaining said cap to said grip body.

2. A handle grip according to claim 1, and further including a ring attaching portion formed in said outer surface at said first end of said grip body and a ring mounted on said ring attaching portion and securely retained thereto due to said resilient expansion force.

3. A handle grip according to claim 1, wherein said second end of said grip body is provided with a transverse end wall having an aperture formed therein.

4. A handle grip according to claim 2, wherein said ring attaching portion is flared outwardly to provide a larger outer diameter of said grip body in the region adjacent said first end.

5. In combination, a handle tube having an end with a predetermined outer diameter and a handle grip fitted over said end of said handle tube, said handle grip comprising:
   a grip body having a predetermined thickness formed of a resilient material and having a first end, a second end and an outer surface extending between said first and second ends;
   an inner bore having an unstressed diameter slightly smaller than the predetermined outer diameter of the handle tube, said inner bore extending axially within said grip body between the first and second ends thereof and receiving said end of said handle tube;
   an attaching portion formed in said outer surface of said grip body adjacent to said second end of said grip body, said attaching portion including two engaging grooves formed therein, said engaging grooves extending radially inwardly partially through the thickness of said grip body from said outer surface toward the axis of said inner bore at positions located about said inner bore and said end of said handle tube, said engaging grooves being circumferentially spaced from each other about said axis; and
   a cap member including two radially inwardly extending engaging projections, said cap member positioned on said attaching portion with said engaging projections being received within said engaging grooves;
   whereby mounting said cap member on said attaching portion and mounting said grip body on said handle tube creates a resilient expansion force at said outer surface due to the smaller unstressed diameter of said grip body relative to the predetermined outer diameter of said handle tube for securely retaining said cap to said grip body.

6. The combination according to claim 5, and further including a ring attaching portion formed in said outer surface at said first end of said grip body and a ring mounted on said ring attaching portion and securely retained thereto due to said resilient expansion force.

7. The combination according to claim 5, wherein said second end of said grip body is provided with a transverse end wall having an aperture formed therein.

8. The combination according to claim 6, wherein said ring attaching portion is flared outwardly to provide a larger outer diameter of said grip body in the region adjacent said first end.

* * * * *